United States Patent [19]

Murtaugh et al.

[11] Patent Number: 4,908,223

[45] Date of Patent: Mar. 13, 1990

[54] OAT OR RICE BASED FROZEN DESSERT AND METHOD FOR PREPARATION

[76] Inventors: Pamela H. Murtaugh; Timothy J. Murtaugh, both of 5025 Lake Mendota Dr., Madison, Wis. 53705

[21] Appl. No.: 336,048

[22] Filed: Apr. 11, 1989

[51] Int. Cl.$^4$ ............................ A23G 9/02; A23G 9/04
[52] U.S. Cl. ..................................... 426/565; 426/658; 426/804
[58] Field of Search ............... 426/565, 566, 567, 658, 426/804

[56] References Cited

U.S. PATENT DOCUMENTS

| | | | |
|---|---|---|---|
| 2,355,028 | 8/1944 | Musher | 426/565 |
| 2,355,029 | 2/1981 | Musher | 426/565 |
| 2,453,142 | 11/1948 | Lee | 426/565 |
| 4,089,848 | 5/1978 | Bell | 426/565 |
| 4,244,981 | 1/1981 | Blake | 426/565 |
| 4,263,334 | 4/1981 | McGinley | 426/565 |
| 4,368,211 | 1/1983 | Blake | 426/565 |

*Primary Examiner*—Jeanette Hunter
*Attorney, Agent, or Firm*—Carl E. Gulbrandsen

[57] ABSTRACT

The present invention is for an oat or rice-based frozen dessert composition which has been prepared using the grain derived solids, including the bran. In the method of the invention, cooked oat or rice grain is mixed with sufficient liquid so as to form a mixture having a composition of about 30% to 70% cooked grain by weight with a moisture content of 50% to 85%. Sweetening and flavoring agents are added to this mixture according to personal preference. The mixture is then homogenized and frozen with churning until a temperature of about $-9.5°$ C. to $-5.5°$ C. is obtained.

21 Claims, No Drawings

OAT OR RICE BASED FROZEN DESSERT AND METHOD FOR PREPARATION

FIELD OF THE INVENTION

The present invention relates to frozen food compositions and their methods of preparation. More particularly, the present invention relates to rice or oat-based frozen food compositions and their method for preparation.

BACKGROUND OF THE INVENTION

Nutritional experts suggest that a healthful diet should contain low amounts of fat, low cholesterol, high amounts of complex carbohydrates and high amounts of fiber. Among grains, oat and rice contain relatively significant amounts of protein and some fat, but the primary solid component of these grains is starch, fiber and other complex carbohydrates. The bran component of oat and rice is particularly high in dietary fiber containing both soluble and insoluble forms. Bran has long been recognized for its digestive benefits. More recently the soluble fiber component of oat and rice bran has been reported to help reduce serum cholesterol levels which may have a beneficial health effect.

The present invention affords a new way to deliver the healthful benefits of oat and rice grains. The invention comprises a complex carbohydrate-based, frozen dessert composition made with oat or rice grain-derived solids including the bran of the grain and a method for its preparation. Depending on the method of preparation, the invention can have either a sorbet-like or an ice cream-like texture. It can be either dairy or non-dairy and still provide the healthful benefits of bran referred to above.

Imitation ice creams have been developed, both for the purpose of eliminating dairy components that cause allergic or intolerance reactions, and to eliminate dairy fat and cholesterol. Examples of such dairy products include U.S. Pat. Nos. 3,355,300 and 3,702,768. Examples of such non-dairy products include U.S. Pat. Nos. 4,609,561 and 4,643,906. These are all fat- and/or protein-based frozen food products. They all require added emulsifiers and/or stabilizers. They have reduced or eliminated dairy fat and cholesterol, but most use saturated vegetable fats and in some cases, eggs, all of which may not be desirable components of a healthy diet.

Starch, in the form of potato flakes, is used as a sweetener in a commercial ice cream product marketed by Al & Reed's Dairy in Idaho Falls, Id. This also is a dairy-fat based product, has little, if any, soluble fiber and requires added stabilizers in the form of vegetable gums.

A fruit-puree-based non-dairy frozen dessert is described in U.S. Pat. 4,368,211. In addition to the fruit-puree, the product requires the addition of a whipping agent, a bodying agent, a stabilizer and an edible fatty triglyceride, in order to make the product organoleptically acceptable.

The inventors of the present invention have made the surprising discovery that the various components of the grain and in particular the polysaccharide gums that make up the water-soluble dietary fiber components of the bran of oat and rice, not only increase the health benefits of the product, but contribute significantly to the body, texture and stability of the product. Thus, if an oat- or rice-based ice-cream-like frozen food is prepared using the method described herein, the need to add whipping agents, bodying agents or stabilizers, which are often artificial and contain unhealthy chemicals, is eliminated or greatly minimized.

Thus, an object of the present invention is to produce an oat or rice-based frozen dessert which retains the nutritional and health benefits of oat or rice bran.

Another objective of the present invention is to produce a frozen dessert product which has a pleasant taste.

Yet another object of the present invention is to produce an oat or rice-based frozen dessert which uses natural ingredients, is easy to manufacture and provides a pleasing texture without the necessity of adding expensive and perhaps unhealthy additives.

To the accomplishment of the foregoing, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

SUMMARY OF THE INVENTION

The present invention is for an oat or rice-based frozen dessert composition which has been prepared using the grain derived solids, including the bran. In the method of the invention, cooked oat or rice grain is mixed with sufficient liquid so as to form a mixture having a composition of about 30% to 70% cooked grain by weight with a moisture content of 50% to 85%. Sweetening and flavoring agents are added to this mixture according to personal preference. The mixture is then homogenized and frozen with churning until a temperature of about $-9.5°$ C. to $-5.5°$ C. is obtained.

Throughout the specification and claims, percentages and ratios by weight and temperatures are given in degrees Celsius unless otherwise indicated.

DETAILED DESCRIPTION OF THE INVENTION

The present invention relates to an oat or rice grain frozen food composition prepared using the grain derived solids, including the bran. The composition comprises a homogenized, frozen, aerated mixture of: (a) cooked oat or rice derived solids, (b) liquefying agent, (c) sweetening agent, and (d) flavoring agent. Each of these composition ingredients as well as product preparation are described in detail below.

A. COOKED OAT OR RICE DERIVED SOLIDS

The principal component of the present ice cream-like frozen food composition is the cooked oat or rice derived solids which provide the necessary body, texture and stability to make the final product organoleptically acceptable. To this end, it has been found that the starch and bran components of the grain are necessary components to the product. It has been further found that it is necessary to first cook the oat or rice derived solids before freezing. Thus, in the preferred embodiment of the present invention, cooked oat or rice grain comprises the principal ingredient and is present in amounts of from about 30% to 70% by weight. In the case of oat, the grain may consist of whole oats, cracked or steel-cut oats, rolled oats, oatmeal, oat flour or any other form of oat which contains also the bran component of the oat. Oat bran itself may be used because unlike other grain brans, such as wheat, oat bran is not easily removed from the rest of the grain particle. Therefore, commercially available oat bran has a nutrient composition very similar to whole oat grain. In the case of rice, unmilled rice or rice flour with the bran component retained is preferred. Rice bran typically contains more fiber and ash and less starch than oat bran does. It may be desirable, therefore, to supplement the rice bran with polished rice kernel, rice flour or oat flour. Depending on the texture desired of the final product, the grain may be more or less finely ground. If it is finely ground, the final product will have a smooth, creamy texture.

The grain is cooked by boiling in water 1-30 minutes (optionally under pressure), depending on the degree of prior processing of the grain, with stirring until the cooked grain obtains a pasty consistency. Cooking the grain softens it, gels the starches and makes the fiber and natural gum components of the grain available to provide the necessary body, texture and stability required for organoleptic acceptance.

B. LIQUEFYING AGENT

A liquefying agent is present in the present frozen food composition in an amount sufficient to provide from about 50% to 85% moisture content. The liquefying agent may consist of water, milk (whole, skim, low-fat, reconstituted powdered milk or cream), grain or legume-based milk substitutes, fruit juice or other liquid matrix or combination of liquids for suspending the cooked solids.

C. SWEETENING AGENT

Suitable materials for use as sweetening agents are well known in the art and include starch hydrolysates such as corn syrup or corn syrup solids, sucrose, dextrose, fructose, maple syrup, honey, or artificial sweeteners such as saccharin or aspartame. Sweetening agents in the form of fruit preparation such as apple juice powder may also be used. The amount of sweetening agent is a matter of preference and is not critical.

D. FLAVORING AGENT

Flavoring agents are well known in the art and include all products that might appropriately be used to flavor ice cream, including concentrated fruit extracts, alcohol-extracts such as vanilla, freeze-dried powders such as coffee or fruits, chocolate or cocoa, fruits and nuts. The amount of flavoring agent used is a matter of preference and is not critical.

E. OPTIONAL INGREDIENTS

The present frozen food composition may also contain various optional ingredients which may be desirable to enhance the product for a particular purpose but are not necessary to practice the invention. For example, coloring agents, acidulants, vitamins, preservatives and the like may be used without detracting from the essence of the invention. In like manner, the inventors have found that satisfactory aeration can be obtained without the use of added whipping agents, and that acceptable body and stability are obtained without the addition of bodying agents and stabilizing agents. Yet, there may be particular applications where the addition of one or more of such agents would be desirable. Such agents are well known in the art and the use of one or more of such agents should not be considered to detract from the essence of the invention and would come within the scope of the claims.

METHOD OF PREPARATION AND USE

The mixture for the present invention is prepared by first mixing the oat and/or rice derived solids with sufficient water to produce a mixture with a moisture content by weight of from 70% to 95% (preferably 75% to 85%). The mixture is heated slowly with constant agitation to about 100° to 110° C. and held for 1-30 minutes (depending on the grind of the oat or rice starting material). This essential cooking step can optionally be performed under increased pressure. The cooked solids are then homogenized. This can be as simple as using a home food processor or blender, or can involve well known production scale homogenization techniques. Sweetening, flavoring, and optional ingredients and a sufficient liquefying agent to produce a total moisture content of from about 50-85% are added and mixed together in any order and by any conventional means. Depending on the nature of these additions or the method of freezing to be employed, further homogenization may be necessary or desirable.

After the ingredients are thoroughly mixed, but prior to the essential freezing process, the composition can be packaged in conventional packaging such as pouches, tubs, or the like, for storage or transportation. It is anticipated that the above described mixture would be produced and distributed unfrozen and unaerated in bulk to the fast food or restaurant trade where it would be frozen and aerated immediately prior to use.

Conventional apparatus such as Taylor Freeze Corp. Model Y150 can be used to freeze and aerate the above described mixture to prepare soft serve forms of frozen desserts. Typically, these units perform the freezing step at about −5.5° C. while agitating. Of course, other equipment operating at other freezing temperatures can be used to prepare other forms of frozen desserts. Conventional ice cream aerating and freezing apparatus can be used to freeze at −9.5° to −7.5° C. to produce a product having properties similar to ice cream.

EXAMPLE 1

An oat bran-based aerated, soft serve frozen dessert of the present invention is prepared having the following composition:

| Ingredient | Weight % |
| --- | --- |
| Oat bran | 9.4 |
| Water | 37.0 |
| Salt | 0.3 |
| Unsweetened chocolate | 3.0 |
| Sucrose | 12.9 |
| Vanilla extract | 0.5 |
| Skim milk | 36.9 |
| | 100.0% |

The oat bran is milled to the consistency of a fine flour. It and the salt is then dispersed evenly in the water at ambient temperature. The mixture is brought to a boil slowly with content mixing until it is a very thick consistency. It is removed from heat, and the chocolate is added with stirring to melt it. The sugar and vanilla are added and the mixture is homogenized in a food processor, Waring blender or similar apparatus. The milk is added gradually with continued homogenization. The mixture is then aerated and frozen in a Taylor model Y150 at −6° C. The resulting product is an aerated soft frozen dessert which has the texture and appearance of commercial soft serve ice cream, has a density of about 0.9 g/ml, and has a total moisture content of about 71%.

Compositions of similar physical and organoleptic properties are realized when, the flavoring agents (chocolate and vanilla) of Example 1 are replaced with appropriate amounts of other concentrated flavor extracts.

Compositions with a creamier texture and mouthful are realized when, in the Example 1 dessert composition, the skim milk is replaced by an equivalent amount of whole or low-fat milk.

Non-dairy compositions may also be realized by replacing the skim milk of Example 1 with an equivalent amount of water.

EXAMPLE 2

An oat bran-based, sugar-free aerated, frozen dessert of the present invention is prepared having the following composition:

| Ingredient | Weight % |
| --- | --- |
| Oat bran | 11.1 |
| Water | 43.0 |
| Salt | 0.3 |
| Vanilla extract | 1.2 |
| Skim milk | 43.2 |
| "Non-nutritive" sweetener* | 1.2 |
| | 100.0% |

The oat bran is prepared and cooked as described in Example 1. The cooked oat bran is homogenized as described in Example 1. The vanilla is added and the mixture is further homogenized. The milk is added gradually with continued homogenization. The sweetener is added and mixed. The mixture is frozen as described in Example 1. The resulting product has a density of about 0.75 g/ml, and has a total moisture content of about 83%.

EXAMPLE 3

An oat bran-based, non-dairy, fruit-containing aerated frozen dessert of the present invention is prepared having the following composition:

| Ingredient | Weight % |
| --- | --- |
| Oat bran | 8.3 |
| Water | 40.5 |
| Salt | 0.2 |
| Sucrose | 16.2 |
| Strawberry puree (10.1% solids) | 32.4 |
| Lemon juice | 2.4 |
| | 100.0% |

*"Non-nutritive" sweetener = Equal brand NUTRASWEET (containing dextrose with dried corn syrup, aspartame, silicon dioxide, cellulose, tribasic calcium phosphate, and cellulose derivatives).

The oat bran is prepared and cooked as described in Example 1. It is removed from heat, and the sugar is added with stirring. The mixture is homogenized as described in Example 1. The pureed strawberry, lemon juice and water are added, then the mixture is further homogenized. The mixture is frozen as described in Example 1. The resulting product has a density of about 0.9 g/ml, and has a total moisture content of about 72%.

EXAMPLE 4

A rice bran-based composition of the present invention is prepared having the following composition:

| Ingredient | Weight % |
| --- | --- |
| Rice bran | 5.0 |
| Polished rice | 4.7 |
| Water | 55.9 |
| Salt | 0.2 |
| Freeze-dried coffee powder | 0.9 |
| Sucrose | 14.1 |
| Vanilla extract | 0.5 |
| 2% milk | 18.7 |
| | 100.0% |

The rice bran is milled to the consistency of a fine flour. The rice bran flour, polished rice and salt are mixed in the water at ambient temperature. The mixture is brought to a boil slowly and cooked under 15 psi for 20 minutes. The cooked rice is homogenized. The remaining ingredients are mixed with the rice homogenate and the entire mixture is further homogenized. The mixture is then aerated and frozen as described in Example 1. The resulting product has a density of about 0.9 g/ml and has a total moisture content of about 73%.

I claim:

1. A frozen dessert composition, comprising:
    (a) from about 30% to 70% by weight of cooked oat or rice-derived, bran containing solids;
    (b) a liquefying agent in an amount sufficient to provide the composition with a moisture content of from about 50% to 85% by weight;
    (c) a sweetening agent;
    (d) a flavoring agent;
    said composition being homogenized, aerated and frozen.

2. A composition as claimed in claim 1, wherein said oat or rice-derived, bran containing solids is a combination of oat and rice derived solids.

3. A composition as claimed in claim 1, wherein said oat or rice-derived, bran containing solids is oat bran.

4. A composition as claimed in claim 1, wherein said oat or rice-derived, bran containing solids is ground unmilled rice.

5. A composition as claimed in claim 1, wherein said oat or rice-derived, bran containing solids is finely ground.

6. A composition as claimed in claim 1, further comprising from about 0% to 50% by weight of milk.

7. A composition as claimed in claim 1, further comprising from about 0% to 50% fruit juice.

8. A method for preparing a frozen dessert composition, comprising essentially the steps in sequence of:
    (a) preparing cooked oat or rice-derived, bran containing solids so as to make cooked solids;
    (b) mixing to form a mixture
        (1) from about 30% to 70% by weight of said cooked solids;
        (2) a sweetening agent;
        (3) a flavoring agent;
        (4) a liquefying agent in sufficient amount to provide a moisture content of about 50% to 85% by weight;
    (c) homogenizing said mixture;
    (d) freezing with agitating said mixture until it reaches a temperature of from about −9.5° to −5.5° C.

9. A method as claimed in claim 8, wherein said solids are finely ground.

10. A method as claimed in claim 8, further comprising mixing with said mixture from about 0% to 50% by weight of milk.

11. A method as claimed in claim 8, further comprising mixing with said mixture from about 0% to 50% fruit juice.

12. A method for preparing a frozen dessert composition, comprising essentially the steps in sequence of:
   (a) stirring from about 5% to 30% by weight oat or rice-derived, bran containing solids in about 70% to 95% by weight water so as to form water containing said solids;
   (b) heating to a boil said water containing said solids so as to form cooked oat or rice-derived, bran containing solids;
   (c) mixing to form a mixture
       (1) from about 30% to 70% by weight of said cooked oat or rice-derived, brain containing solids;
       (2) a sweetening agent;
       (3) a flavoring agent;
       (4) a liquefying agent in sufficient amount to provide a moisture content of about 50% to 85% by weight;
   (d) homogenizing said mixture;
   (e) freezing with agitating said mixture until it reaches a temperature of from about −9.5° to −5.5° C.

13. A method as claimed in claim 12, wherein said oat or rice-derived, bran containing solids is a combination of oat and rice derived solids.

14. A method as claimed in claim 12, wherein said oat or rice-derived, bran containing solids is oat bran.

15. A method as claimed in claim 12, wherein said oat or rice-derived, bran containing solids is ground unmilled rice.

16. A method for preparing a frozen dessert composition, comprising essentially the steps in sequence of:
   (a) stirring from about 20% by weight oat bran in about 80% by weight water so as to form water containing oat bran;
   (b) heating to a boil said water containing said oat bran so as to form cooked oat bran;
   (c) mixing to form a mixture
       (1) from about 50% by weight of said cooked oat bran;
       (2) a sweetening agent;
       (3) a flavoring agent;
       (4) milk in sufficient amount to provide a moisture content of about 50% to 85% by weight;
   (d) homogenizing said mixture;
   (e) freezing with agitating said mixture until it reaches a temperature of from about −6.0° C.

17. A method as claimed in claim 16, wherein said flavoring agent is chocolate.

18. A method as claimed in claim 16, wherein said flavoring agent is vanilla.

19. A method as claimed in claim 16, wherein said flavoring agent is strawberry.

20. A method for preparing a frozen dessert composition, comprising essentially the steps in sequence of:
   (a) stirring from about 20% by weight oat bran 80% by weight water so as to form water containing oat bran;
   (b) heating to a boil said water containing oat bran so as to form cooked oat bran;
   (c) mixing to form a mixture
       (1) from about 50% of said cooked oat bran;
       (2) a sweetening agent;
       (3) a flavoring agent;
       (4) water in sufficient amount to provide a moisture content of about 50% to 85% by weight;
   (d) homogenizing said mixture;
   (e) freezing with agitating said mixture until it reaches a temperature of from about −6.0° C.

21. A method for preparing a frozen dessert composition, comprising essentially the steps in sequence of:
   (a) stirring from about 10% by weight rice bran flour with from about 10% by weight polished rice in about 80% by weight water so as to form water containing said rice bran flour and polished rice;
   (b) heating to a boil said water containing said rice bran flour and polished rice so as to form cooked rice bran flour and polished rice;
   (c) mixing to form a mixture
       (1) from about 65% by weight of said cooked rice bran flour and polished rice;
       (2) a sweetening agent;
       (3) a flavoring agent;
       (4) a liquefying agent in sufficient amount to provide a moisture content of about 50% to 85% by weight;
   (d) homogenizing said mixture;
   (e) freezing with agitating said mixture until it reaches a temperature of from about −6.0° C.

* * * * *